3,049,012
RADIATION COMPENSATING THERMO-ELECTRIC DEVICE

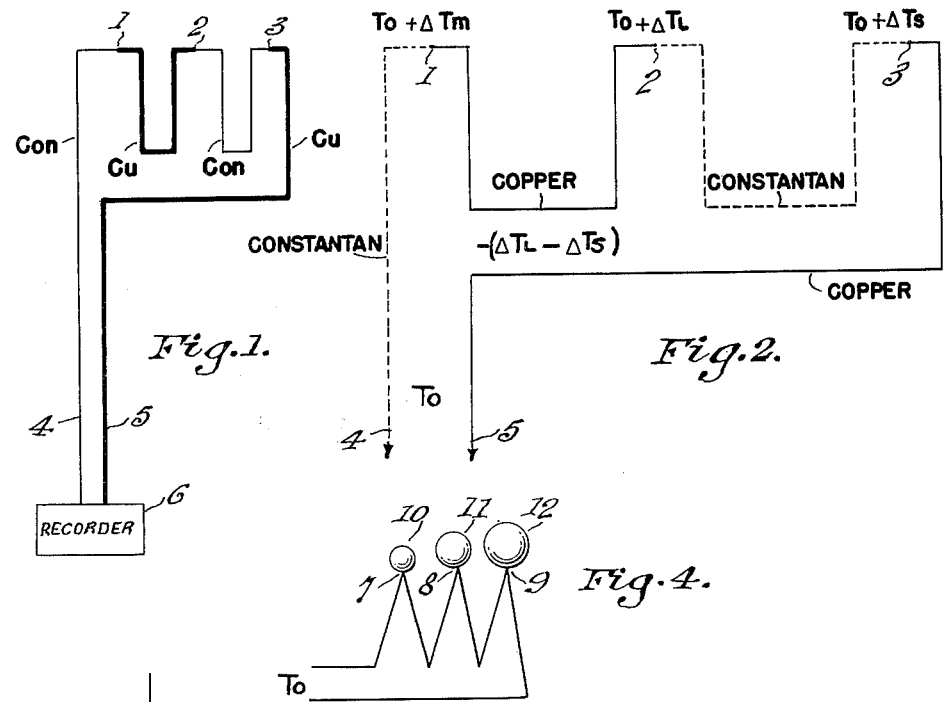
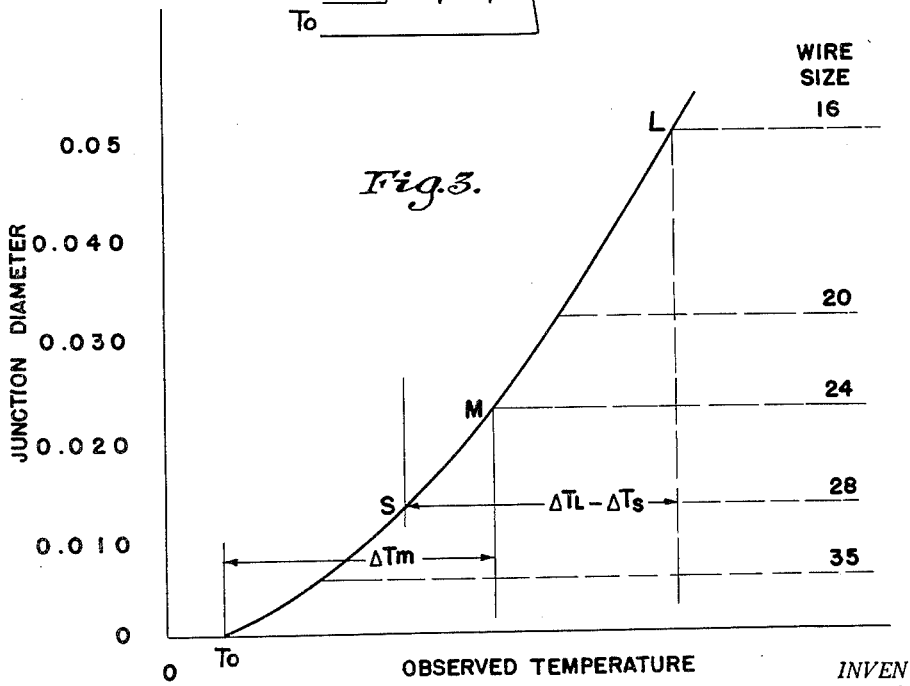

Glenn E. Daniels, Bisbee, Ariz., assignor to the United States of America as represented by the Secretary of the Army
Filed Mar. 4, 1960, Ser. No. 12,883
10 Claims. (Cl. 73—359)
(Granted under Title 35, U.S. Code (1952), sec. 266)

The invention described herein may be manufactured and used by or for the Government of the United States of America for governmental purposes without the payment of royalties thereon or therefor.

The present invention relates to temperature measuring instruments and particularly to temperature measuring instruments utilizing the properties of thermoelectric devices such as thermocouples and the like.

Temperature measuring instruments utilizing the properties of the electro thermocouple are widely used in industry, particularly in the field of pyrometry. While use has been made of the thermocouple in meteorological work, the thermocouple has, in this application, serious defects. One of the most serious in any thermometer is the error due to radiation gains or losses. One common method of reducing the error is to utilize a radiation shield. Shields may be placed around the thermocouple hot junction or thermometer bulb so that it cannot "see" the hotter or colder surfaces or areas. Shields, however, have their limitations; they are bulky, with the consequence that the shielded thermocouple-type thermometers cannot, for example, measure temperatures close to the ground in meteorological work, in addition shields prevent the free circulation of air to the thermometer.

The radiation error of a thermocouple is related to the size of the thermocouple junction. It is now well known that the radiation error of a thermocouple decreases as the size of the wire decreases. This fact has been utilized by a number of investigators in the determination of the true temperature of a gas. Waggener in Germany, in 1895, outlined a method for the determination of the true temperature of a Bunsen burner flame by using a plurality of thermocouples of varying wire size and then plotting a curve of temperature against the wire size. The curve was then extrapolated to a zero-diameter thermocouple to give the true temperature. That is, the temperature that a zero diameter thermocouple would give, can be obtained.

While numerous methods have been employed to compensate for radiation errors in thermocouples none have been very satisfactory, and none have attacked the problem from the standpoint of Waggener's teaching to provide a wholly compensated thermocouple. The methods commonly employed require elaborate shunts, bulky shields, movable shutters, special painting or coating, and the like, each introducing problems of additional costs, limited application, and only approximate compensation.

A study of Waggener's method for the determination of the true temperature, together with an empirical study of many thermocouples, led to the hypothesis that a compound thermocouple comprising three junctions in series, without special painting or coating, a principal measuring unit with two other thermocouples, one having a large junction size and one having a small junction size, connected in a "series-opposition" arrangement would provide a temperature measuring means which is compensated for radiation errors. A three-unit thermocouple constructed in accordance with this new approach was found to give results which agreed closely with those obtained by the indirect extrapolation method. The novel thermocouple made possible the measurement of temperatures very close to the ground inasmuch as the need for large radiation shields was eliminated and accurate measurements of air temperature at other levels above the ground were also possible without radiation shields.

It is accordingly a principal object of this invention to utilize the relationship between radiation error and the size of a radiating surface in thermo electric devices to provide a temperature measuring means which is substantially free of radiation error over a wide range of temperature variations.

A further object of this invention is to utilize the relationship between the radiation error and the wire size at the thermojunction to provide a temperature measuring means which is substantially free of radiation error over a wide range of temperature variation.

Other objects and many of the attendant advantages of this invention will be readily appreciated as the same becomes better understood by reference to the following detailed description when considered in connection with the accompanying drawings in which like reference numerals designates like parts throughout the figures thereof and wherein:

FIGURE 1 is a schematic diagram of a thermoelectric thermometer circuit arranged in accordance with this invention.

FIGURE 2 is a schematic representation of a thermoelectric thermometer arrangement in accordance with the invention in which the distribution of the radiation errors is indicated.

FIGURE 3 is a graph showing the relationship between the junction size of a thermocouple and the radiation error.

FIGURE 4 is a diagram of another form of the invention.

The thermocouple units 1, 2 and 3 of FIGURE 1 are composed of two wires of dissimilar metals such as, for example, a constantan wire 4 and a copper wire 5. The size of the wires used at the junction is not the same for all units, but is preselected in a manner hereinafter explained. The circuit of FIGURE 1 utilizes a "series connection" wherein the polarity of one of the thermocouple units 2, for example, is arranged in opposition to that of the other two thermocouples 1 and 3. The temperature reading on recorder 6 will thus equal the temperature measured by thermocouple 1 without the radiation errors of thermocouples 1, 2 and 3.

An understanding of the operation of the radiation-compensated thermocouple may be better had by reference to FIGURE 2, taken in connection with the graph of FIGURE 3. In the use of the thermocouple for meteorological measurements or other temperature measurements, all three units, 1, 2 and 3 are subjected to the same temperature $T_0$. The error due to radiation may be represented as $\Delta T_m$ for unit 1, as $\Delta T_L$ for unit 2, and $\Delta T_S$ for unit 3. Thus to provide an output which is representative of the actual temperature $T_0$ it is necessary to satisfy the relationship $$\Delta T_m - \Delta T_L + \Delta T_s = 0, \text{ or that } \Delta T_m = \Delta T_L - \Delta T_s$$

This is accomplished in accordance with the present invention through the preselection of the wire size of each of the three junctions and the "series opposition" connection of units 1, 2 and 3 of FIGURES 1 and 2.

One method for the determination of the correct junction size for a compensated thermocouple utilizes the principle depicted by the graph of FIGURE 3, which illustrates the relationship between the junction or sensor size and the observed temperature.

The curve of FIGURE 3 represents a test made on five thermocouples having wire sizes of Nos. 35, 28, 24, 20, and 16 AWG respectively at a time when the radiation errors were positive, i.e., they resulted in a temperature reading greater than the correct temperature on each thermocouple. If the radiation source surrounding a thermocouple were colder than the media being measured, such as would occur in a furnace with walls colder than the material in the furnace, then the radiation error will cause a single thermocouple to read lower than the correct temperature; therefore, the radiation error will be negative. In each case the thermocouple was fabricated using copper and constantan wires carefuly butted and silver-soldered to maintain a uniform diameter at the junction. It is to be understood, of course, that in each case the environmental temperature is the same, $T_0$. The radiation error is determined as the difference between the point $T_0$ and the observed temperature. As previously stated, and depicted by the graph of FIGURE 3, the radiation error is large in magnitude for the large size sensors and small in magnitude for the small size sensors. The error is zero for a junction having zero diameter as represented by the point $T_0$. If, therefore, a wire size of No. 24 AWG is selected for use as a sensor size for the temperature-measuring thermocouple $T_m$, its corresponding error will be $\Delta T_m$, where $T_m = T_0 + \Delta T_m$. In accordance with this invention then it is necessary to preselect two other junction sizes, one smaller and one larger, $T_s$ and $T_L$, respectively, so that all three are connected as shown in FIGURES 1 or 2, the following relationship will be satisfied:

$$\Delta T_m = \Delta T_L - \Delta T_S$$

Thus the selection of No. 16 AWG wire for the larger junction, and of a No. 28 AWG wire for the smaller junction provided units, when connected in accordance with FIGURE 1, with a No. 24 AWG wire for the measuring junction, compensated to a high degree for radiation error.

A further method for the determination of the sizes of the three sensors is that involving the computation of relative errors in terms of junction size. It is well established that the radiation error varies with the wire size of the junction. Actually the error has been found to be proportional to the diameter of the junction. Table I has been developed on this basis for spherical sensors and, using No. 16 AWG junction wire size as a reference, shows the relative errors for five different junction sizes when assumed to be acting as spherical sensors. If the error for No. 16 size is taken as $\Delta T/1$, then for a smaller juntion the error will be smaller and can be expressed by an amount $\Delta T/(1+\theta)$, where $\theta$ is the ratio of the No. 16 AWG wire size to that of the new size considered. For No. 24 AWG wire the relative error becomes $$\Delta T/(1+2.54)$$

for No. 28 AWG wire we obtain $\Delta T/(1+4.02)$, and so on. In using Table I it is necessary only to decide on a sensor size for the temperature measuring unit, and then by inspection select two other sizes, usually one smaller and one larger, so that the difference in the errors is equal to that indicated for the measuring unit. For example, if a No. 24 AWG wire is selected as the size for the temperature measuring junction, having a relative error of $\Delta T/3.5$, or $\Delta T(0.285)$, then the selection of No. 16 AWG wire has a relative error of $\Delta T(0.5)$ and No. 28 a relative error $\Delta T(0.2)$, to provide a difference of 0.3 which is the closest to 0.285. This provides a correction of 0.285/0.3 or 95 percent. To provide a more complete compensation would require the availability of other wire sizes.

Table I

| Wire Size, AWG | Diameter, Inches | Relative Radiation Error |
|---|---|---|
| 16 | 0.058 | T |
| 20 | 0.032 | 0.385 T |
| 24 | 0.020 | 0.285 T |
| 26 | 0.016 | 0.240 T |
| 28 | 0.0126 | 0.200 T |
| 35 | 0.0056 | 0.100 T |

The foregoing method of computing the relative errors and determining the junction size is applicable only to spherical shape junctions. Since thermocouples can be fabricated in any shape: spherical, cylindrical, rectangular, flat, or combinations of these, any variation from the spherical shaped construction will require a different form of computation. Because some of these can be quite involved, it is probably more expedient to resort to the construction of several thermocouples all of the same configuration, and junction material, and plot a graph somewhat after the manner of FIGURE 3 and to determine the combination of required junctions therefrom.

While the foregoing explanation has been concerned with thermocouples of the wire type, the feature of the invention wherein the preselection of three thermocouples, connected in the manner of FIGURE 1, applies with equal force for other shaped junctions. It will likewise be apparent to those skilled in the art, in view of the teaching herein, that an odd number (three or more such as five, seven, etc.) of thermocouples could be employed provided that the algebraic sum of their radiation errors is made equal to zero. Ordinarily the construction will involve three junctions of varying size, but in some instances it may be desirable to employ two that are of equal size and one of a larger size. In addition, although the test of thermocouples were fabricated of copper and constantan wire, the feature of the invention applies with equal force for other thermocouple materials.

The diagram of FIGURE 4 illustrates another form of the invention. In this embodiment of the thermojunctions are not required to have the area relationships hereinbefore utilized in connection with the embodiment of FIGURES 1 and 2. The correction for the radiation error is accomplished through the selection of sensor sizes associated with each of the thermojunctions. Thus thermojunctions 7, 8 and 9, may be of the same size, shape and material combinations, and sensors 10, 11 and 12 respectively, having their exposed surface preselected to introduce radiation error factors into the developed voltage. The method of connecting the thermojunctions remains the same, that is, series-opposition.

Although the sensors depicted in FIGURE 4 are shown to be spherical, they may be selected to have any convenient form: flat, conical, and the like. The attachment of the sensors to the thermojunctions may be made in any of the well-known ways.

While it is possible to calculate the radiation characteristics of the sensors, it is probably more practical to construct a series of units subjecting them to identical temperatures and then plotting a curve somewhat similar to that of the graph of FIGURE 3. The preselection of the sensor sizes would then be made in the manner explained in connection with FIGURES 1 and 2.

In the light of the teaching of the instant invention the selection of the correct junction size for the thermocouples of FIGURES 1 and 2, and of the correct sensor size for the sensors of FIGURE 4, can always be made by the "cut and try" method which, based on a knowledge of the radiation characteristics of surfaces, or on prior experience with similar units, may be quite effective in some instances.

It should be understood, of course, that the foregoing disclosure relates only to preferred embodiment of the invention and that it is intended to cover all changes and modifications of the examples of the invention herein chosen for purposes of the disclosure, which do not constitute departures from the spirit and scope of the invention set forth in the appended claims.

What is claimed is:

1. A temperature measuring device comprising three thermoelectric elements, each of said elements having an exposed radiating surface area and means for producing a temperature indicating electrical output subject to the radiation effects dependent on the exposed radiating surface area, the first and second of said elements being selected to have exposed areas such that the sum of their radiation effects equals the radiation effect of said third element, and means for connecting said three elements with said first and second elements in series addition, and said third element in series opposition.

2. A temperature measuring device comprising three thermocouple elements, each of said elements producing a temperature indicating voltage output subject to the radiation error dependent on the radiating surface of the thermojunction, the first and third of said thermocouple elements being selected to have surface areas at the junction such that the sum of their radiation errors equals the radiation error of said third, and means for connecting said three elements with said first and second in series addition, and said third in series opposition.

3. A temperature measuring device comprising a first thermocouple having a predetermined inherent error, a second thermocouple of a predetermined inherent error connected in additive relation to said first thermocouple, a third thermocouple having a predetermined inherent error connected in opposition to said first and second thermocouples, the predetermined error of said third thermocouple being made equal to the sum of the errors of said first and second thermocouples, whereby the output of the first second and third thermocouples is representative of the temperature being measured.

4. A temperature measuring device comprising a thermocouple unit and a recording means connected to the output thereof said thermocouple unit comprising a first and second thermocouple element connected in additive relation and a third thermocouple element connected in opposing relation to said first and second thermocouple elements, each of said thermocouple elements having an inherent error related to the diameter of the respective thermocouples, the diameters of the thermocouples being preselected so that the difference of errors between any two thermocouples of different wire-size is equal to the error of the other thermocouple of a given size, thereby providing the recording means with an output voltage representative of the temperature being measured.

5. A temperature measuring device comprising: a plurality of individual thermojunctions each having a predetermined radiation error related to the dimension of each of said junctions; means connecting said thermojunctions in a series opposite arrangement whereby the algebraic sum of the radiation errors of said plurality of junctions is substantially equal to zero; and means connected to the output of said plurality of junctions for recording the temperature to which said thermojunctions are exposed.

6. A temperature measuring device comprising a thermocouple unit for developing a voltage representative of the temperature to which said unit is exposed, and indicating means connected to the output of said thermocouple unit for indicating said temperature, said thermocouple unit comprising a first thermojunction having a predetermined inherent error related to its size and shape, a second thermojunction having a predetermined inherent radiation error related to its size and shape, and a third thermojunction having a predetermined inherent radiation error related to its size and shape, said error of said third thermojunction having a value equal to the sum of the radiation errors of said first and second thermojunctions; means for connecting said third thermojunction in circuit with said first and second thermojunctions in a series-opposition manner whereby the radiation error of said third thermojunction cancels out the error present in said first and second thermojunctions, and whereby an output voltage representative of said temperature actuates said indicating means.

7. In a temperature measuring device a compound thermocouple unit comprising first and second thermojunctions each having preselected inherent radiation errors, a third thermojunction having a preselected inherent radiation error equal to the sum of the errors of said first and second junctions, and means for connecting said third junction in series opposition to said first and second junctions, 8. In a temperature measuring device a thermocouple means comprising a combination of at least three separate thermojunctions each of which has a radiation error related to its shape and size, and wherein said individual thermojunctions are related to each other in a predetermined radiation error magnitude relationship, and connecting means for relating said junction to each other to provide a cancellation of said radiation errors in said thermocouple means.

9. In a temperature measuring device a thermoelectric means comprising first and second thermojunctions connected additively, a third thermojunction connected subtractively with respect to said first and second junctions, each of said junctions having a radiation error related to the dimensions of the respective junction, said errors related to each other in magnitude to provide a virtual cancellation of the radiation error in said thermoelectric means.

10. A temperature measuring device comprising three thermoelectric elements, each of said elements having a heat sensing means and a means for developing a temperature indicating electrical output subject to the radiation error dependent on the exposed area of the sensing means, the sensing means associated with the first and second thermoelectric elements having exposed areas such that the sum of their radiation errors equals the radiation error of the sensing means associated with third thermoelectric element, and means for connecting said three elements with said first and second elements in series addition, and said third in series opposition.

References Cited in the file of this patent

UNITED STATES PATENTS

| 2,154,065 | Davis | Apr. 11, 1939 |
| 2,578,890 | Ledin | Dec. 18, 1951 |

OTHER REFERENCES

Report No. R–252, Climatic Research Laboratory, Lawrence, Mass., Army Service Forces, Quartermaster Corps., Oct. 22, 1945, pp. 1–3, 5–9, 12, 14–16, 25–28.